Jan. 4, 1966 W. FEINBLOOM 3,227,507

CORNEAL CONTACT LENS HAVING INNER ELLIPSOIDAL SURFACE

Filed Aug. 16, 1961 3 Sheets-Sheet 1

INVENTOR.
WILLIAM FEINBLOOM
BY
Charles H. Brown
Attorney

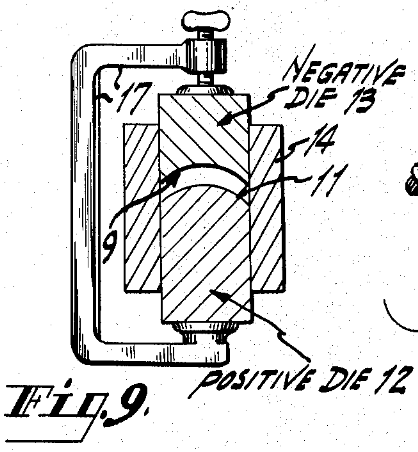
FIG. 9.
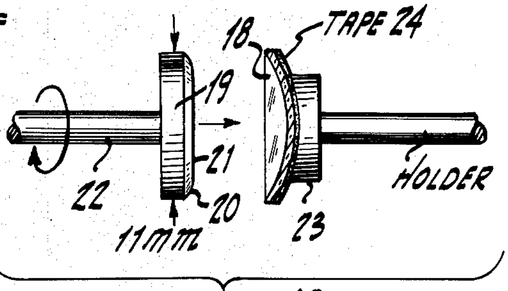
FIG. 10.
| $R_o$ ↓ / $R_5$ → | 7.50 | 8.00 | 8.50 | 9.00 | 9.50 | 10.00 | 10.50 | 11.00 | 11.50 |
|---|---|---|---|---|---|---|---|---|---|
| 7.00 | X | X | X | X | X | X | | | |
| 7.05 | X | X | X | X | X | X | | | |
| 7.10 | X | X | X | X | X | X | | | |
| 7.15 | X | X | X | X | X | X | | | |
| 7.20 | X | X | X | X | X | X | | | |
| 7.25 | X | X | X | X | X | X | | | |
| 7.30 | X | X | X | X | X | X | | | |
| 7.35 | | X | X | X | X | X | X | | |
| 7.40 | | X | X | X | X | X | X | | |
| 7.45 | | X | X | X | X | X | X | | |
| 7.50 | SPHERE | X | X | X | X | X | X | | |
| 7.55 | | X | X | X | X | X | X | | |
| 7.60 | | X | X | X | X | X | X | | |
| 7.65 | | X | X | X | X | X | X | | |
| 7.70 | | X | X | X | X | X | X | | |
| 7.75 | | X | X | X | X | X | X | | |
| 7.80 | | X | X | X | X | X | X | | |
| 7.85 | | | X | X | X | X | X | X | |
| 7.90 | | | X | X | X | X | X | X | |
| 7.95 | | | X | X | X | X | / | X | |
| 8.00 | | SPHERE | X | X | X | X | X | X | |
| 8.05 | | | X | X | X | X | X | X | |
| 8.10 | | | X | X | X | X | X | X | |
| 8.15 | | | X | X | X | X | X | X | |
| 8.20 | | | X | X | X | X | X | X | |
| 8.25 | | | X | X | X | X | X | X | |
| 8.30 | | | X | X | X | X | X | X | |
| 8.35 | | | | X | X | X | X | X | X |
| 8.40 | | | | X | X | X | X | X | X |
| 8.45 | | | | X | X | X | X | X | X |
| 8.50 | | | SPHERE | X | X | X | X | X | X |
| 8.55 | | | | X | X | X | X | X | X |
| 8.60 | | | | X | X | X | X | X | X |
| 8.65 | | | | X | X | X | X | X | X |
| 8.70 | | | | X | X | X | X | X | X |
FIG. 11.
INVENTOR.
WILLIAM FEINBLOOM
BY
Charles H. Brown
Attorney Jan. 4, 1966 W. FEINBLOOM 3,227,507

CORNEAL CONTACT LENS HAVING INNER ELLIPSOIDAL SURFACE

Filed Aug. 16, 1961 3 Sheets-Sheet 3

R SPHERE → VERTICAL MERIDIAN

HORIZONTAL MERIDIAN OF ELLIPSE $R_0$ ↓

| | 7.0 | 7.1 | 7.2 | 7.3 | 7.4 | 7.5 | 7.6 | 7.7 | 7.8 | 7.9 | 8.0 | 8.1 | 8.2 | 8.3 | 8.4 | 8.5 |
|---|---|---|---|---|---|---|---|---|---|---|---|---|---|---|---|---|
| 7.25 | X | X | X | X | X | X | X | X | X | X | X | X | X | X | X | X |
| 7.30 | X | X | X | X | X | X | X | X | X | X | X | X | X | X | X | X |
| 7.35 | X | X | X | X | X | X | X | X | X | X | X | X | X | X | X | X |
| 7.40 | X | X | X | X | X | X | X | X | X | X | X | X | X | X | X | X |
| 7.45 | X | X | X | X | X | X | X | X | X | X | X | X | X | X | X | X |
| 7.50 | X | X | X | X | X | X | X | X | X | X | X | X | X | X | X | X |
| 7.55 | X | X | X | X | X | X | X | X | X | X | X | X | X | X | X | X |
| 7.60 | X | X | X | X | X | X | X | X | X | X | X | X | X | X | X | X |
| 7.65 | X | X | X | X | X | X | X | X | X | X | X | X | X | X | X | X |
| 7.70 | X | X | X | X | X | X | X | X | X | X | X | X | X | X | X | X |
| 7.75 | X | X | X | X | X | X | X | X | X | X | X | X | X | X | X | X |
| 7.80 | X | X | X | X | X | X | X | X | X | X | X | X | X | X | X | X |
| 7.85 | X | X | X | X | X | X | X | X | X | X | X | X | X | X | X | X |
| 7.90 | X | X | X | X | X | X | X | X | X | X | X | X | X | X | X | X |
| 7.95 | X | X | X | X | X | X | X | X | X | X | X | X | X | X | X | X |
| 8.00 | X | X | X | X | X | X | X | X | X | X | X | X | X | X | X | X |
| 8.05 | X | X | X | X | X | X | X | X | X | X | X | X | X | X | X | X |
| 8.10 | X | X | X | X | X | X | X | X | X | X | X | X | X | X | X | X |
| 8.15 | X | X | X | X | X | X | X | X | X | X | X | X | X | X | X | X |
| 8.20 | X | X | X | X | X | X | X | X | X | X | X | X | X | X | X | X |
| 8.25 | X | X | X | X | X | X | X | X | X | X | X | X | X | X | X | X |
| 8.30 | X | X | X | X | X | X | X | X | X | X | X | X | X | X | X | X |
| 8.35 | X | X | X | X | X | X | X | X | X | X | X | X | X | X | X | X |
| 8.40 | X | X | X | X | X | X | X | X | X | X | X | X | X | X | X | X |
| 8.45 | X | X | X | X | X | X | X | X | X | X | X | X | X | X | X | X |
| 8.50 | X | X | X | X | X | X | X | X | X | X | X | X | X | X | X | X |
| 8.55 | X | X | X | X | X | X | X | X | X | X | X | X | X | X | X | X |
| 8.60 | X | X | X | X | X | X | X | X | X | X | X | X | X | X | X | X |
| 8.65 | X | X | X | X | X | X | X | X | X | X | X | X | X | X | X | X |
| 8.70 | X | X | X | X | X | X | X | X | X | X | X | X | X | X | X | X |

Fig. 12.

INVENTOR.
WILLIAM FEINBLOOM
BY
Charles H. Brown
Attorney 3,227,507
Patented Jan. 4, 1966

1

3,227,507
CORNEAL CONTACT LENS HAVING INNER ELLIPSOIDAL SURFACE

William Feinbloom, 105 E. 35th St., New York, N.Y.
Filed Aug. 16, 1961, Ser. No. 131,796
5 Claims. (Cl. 351—160)

This invention concerns an improved concavo-convex contact lens of the type which is designed to rest upon the cornea or over the colored portion of the eye and not extend into the scleral or white portion.

The present day art of fitting corneal contact lenses, generally stated, consists in selecting a lens made up of an inner spherical surface (or toric surface) to best fit the corneal curves of the eye at the apex of the cornea and then examining this fit with fluorescein solution between the lens and the eye. It is almost invariably found by this procedure that if the lens clears the apex of the cornea it impinges tightly on the peripheral areas. By a series of auxiliary bevels or secondary surfaces these areas are ground away in an attempt to obtain the best approximate fit of the cornea. Thus in an average corneal type contact lens of 10 mm. diameter the inner 6 to 7 mm. is usually left untouched, and is the radius closely approximating the keratometer value of the corneal radius, and the remaining 1.5 to 2 mm. circular annulus is ground to one or more longer radii.

To be more specific, according to conventional practice, in order to make the inner surface of the lens compatible to the cornea, the lens is first reduced in diameter to as small a size as possible for the purpose of using the central "optic zone" of about 6 to 7 mm. in diameter as a bearing surface for the lens. However, a lens as small as 6 to 7 mm. in diameter does not work well in the eye because of two problems that arise. (1) Such a small lens nearly always causes lid irritation in blinking due to the fact that the margin of the lids contains the greatest concentration of nerve endings and, (2) such lenses slip readily due to lid action and will either be displaced off the cornea or fall out of the eye. Still further, such lenses are not satisfactory because of the tight fit at the peripheral areas.

In an attempt to solve the foregoing problems, it has been suggested in Butterfield U.S. Patent 2,544,246, granted March 6, 1951, that the corneal lens have an inner spherical central area and an outer marginal portion formed by a series of separate and discrete steps to introduce a "parabolic" fit. The result of this suggestion is to produce a surface of uncertain rate of change of curvature when these "steps" are "blended."

Touhy Patent 2,510,438, granted June 6, 1950, discloses a corneal contact lens having a radius of curvature on its concave side slightly greater than the radius of curvature of the cornea with an increasing clearance at the marginal areas of the lens. Such a lens does not provide an adequate means of even closely conforming to the shape of the cornea because there can be no spherical surface constructed "slightly greater than the radius of curvature of the cornea to which it is applied" that will do anything but set up a gradient of pressure on the cornea with a maximum pressure at the apex and a minimum towards the edge.

The usual procedure in the art of fitting corneal contact lens is to use a lens of an average of 9.5 mm. diameter—the lenses usually vary from 9.0 to 10.5 mm. in diameter. However, as the lens diameter increases, the

2 auxiliary secondary curves beyond the optic zone become wider and wider so that most lenses end up with the optic zone no larger than 6 to 7 mm. and the remainder of the lens surface of such longer spherical radius (of 1 to 2 mm. longer than the optic zone radius) that this area no longer serves as a bearing surface, but as a stand-off shield to bring the edge far enough under the lids in an attempt to avoid lid irritation.

The shape of the cornea of the eye is, in fact, that of an ellipsoid. It is for this reason that the central problem of fitting a corneal contact lens more accurately to the human eye has not been solved by the present day spherical, toric, or parabolic lenses. From my study of the measurements of hundreds of eyes and the making of contact lenses to fit these measurements and the testing of such lenses by actual wearers, I have found that, (a) an ellipsoid represents a better approximation of the form of the surface of the cornea of the human eye, and (b) contact lenses with inner elliptical surfaces represent a marked improvement in the comfort and wearing time by the patient. These highly desirable results may be explained as follows: (1) The elliptical form of surface of the corneal contact lens distributes the pressure of the lens on the cornea more evenly over the surface of the cornea. (2) Larger diameter lenses that avoid lid irritation may now be used than is at present possible because the ellipsoidal surface is a bearing surface and so reduces the total pressure per unit area. (3) The inner ellipsoidal bearing surface results in more accurate centering of the lens around the optic axis of the eye and so avoids astigmatism and provides better visual results (4) The inner ellipsoidal surface results in less slipping of the lens with blinking or eye movements and so reduces friction due to lens movement, and (5) The inner ellipsoidal surface results in less lens rotation and so produces better stationary alignment for cases requiring bifocals and astigmatic correction for residual astigmatism.

In the drawings:

FIGURE 9 shows the equipment for making the lens of the invention;

FIGURE 10 shows how the inner surface of a spherical lens can be ground to form an ellipsoidal peripheral surface in accordance with another embodiment of the invention; and FIGURES 11 and 12 are charts helpful in making two different series of ellipsoidal test lenses to enable the practitioner to quickly check the fit on a patient.

Figures 1, 2, 3, 4, 5, 6, 7, 8:
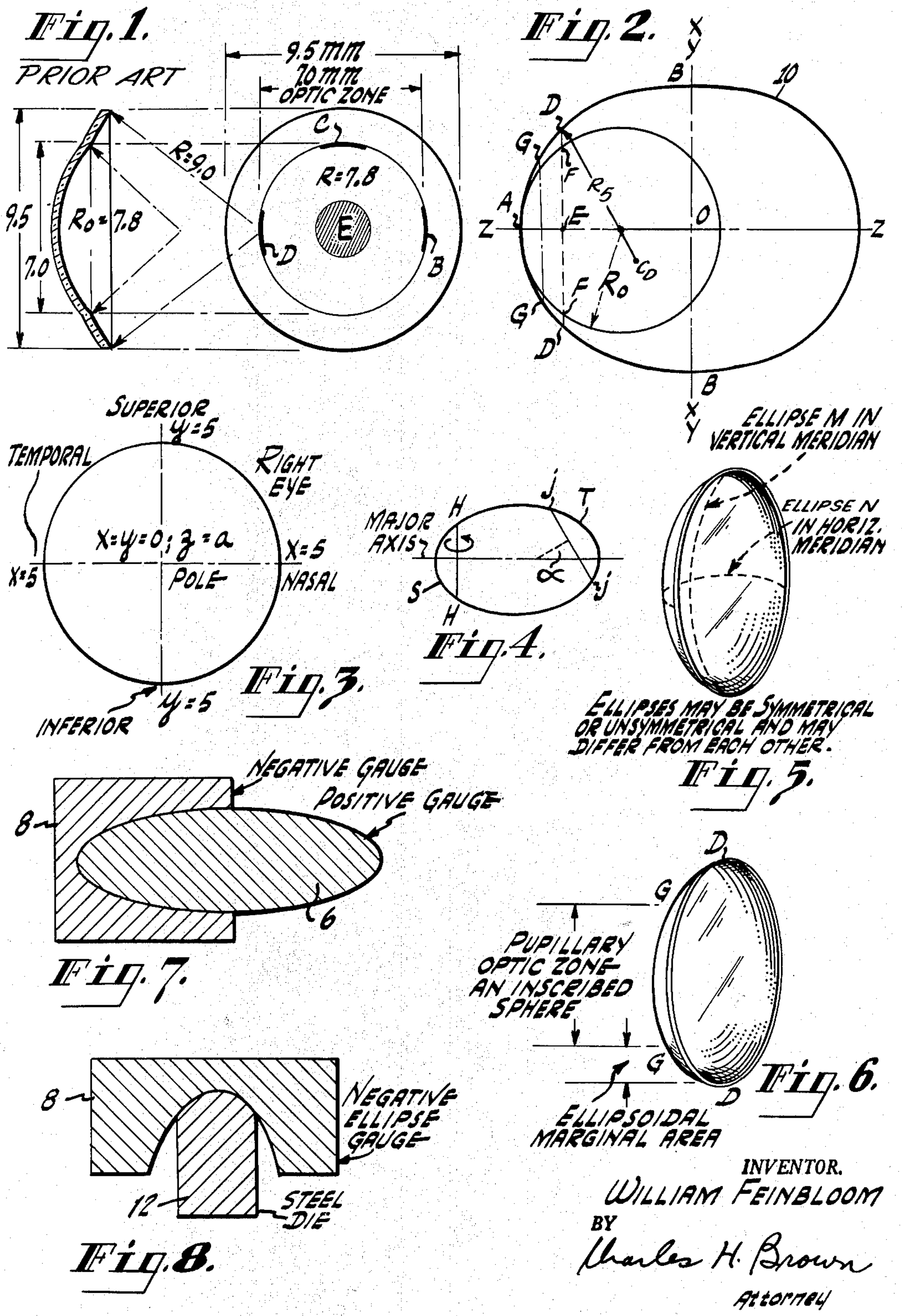
FIGURE 1 illustrates the trouble experienced in the use of conventional lenses.
FIGURE 2 shows the general form of an ellipse, the left portion of which conforms to the shape of the cornea, and is given to aid in the explanation of the invention.
FIGURE 3 is helpful in an understanding of certain measurements related to the right eye and which are referred to hereinafter.
FIGURE 4 illustrates how different ellipsoidal inner surfaces can be generated to form the inner surface of the contact lens of the invention.
FIGURES 5 and 6 show different embodiments of corneal contact lens of the invention.
FIGURES 7 and 8 illustrate how gauges or templates and dies can be made for use in the manufacture of lenses of the invention.

A better appreciation of the results achieved by the corneal contact lens of the invention may be had by examining the radii that are usually employed in the present day art of fitting corneal contact lenses, with particular reference to FIG. 1 of the drawing.

The apex of the optic zone has its radius determined by the ophthalmometer. Let it be assumed, as frequently happens, that this reading is 7.80 mm. Then a lens is usually selected that has a 7.80 mm. inside spherical surface. The diameter chosen depends on the nature of the lid positions, lid tensions etc. Let it be assumed that an average lens of 9.5 mm. diameter is chosen. Then the lens is fabricated as in FIG. 1, so as to have a central optic zone of 7.0 mm. diameter, and the remaining surface is made of 9.0 mm. radius. The edges are then rounded and smoothed as experience dictates, and the lens as thus finished is inserted into the eye; and fluorescein added to flow between lens and eye to observe the nature of the fit under ultra violet light. In many eyes a bright green ring will be observed around the periphery corresponding to the 9.0 mm. radius zone indicating the lens does not rest here but clears completely. In such eyes some blue patches or zones will appear at or near the junction line as at B, C, or D, or a blue area at E which is the central or apex region. These blue areas may remain in all positions that the eye assumes or may appear and disappear as the eye rotates. The bluish areas represent touching areas of pressure of varying degree of the lens on the eye depending on how dark and steadfast they remain over a period of a few minutes as the eye moves about.

If this lens proves uncomfortable for the patient, then the practitioner usually resorts to increasing the width of the 9.0 mm. radius zone and so decreasing the diameter of the optic or 7.0 mm. zone. There is a definite limit below which the optic zone cannot be reduced because when reduced below this limit (6.0 is probably the lowest limit) the patient complains of visual ghosts or flares. What happens is that the visual field is impinged upon by the secondary curve of 9.0 mm. radius and results in great annoyance to the patient. In fact, in nearsightedness where the pupils of the eye are generally larger than average, the optic zone must often be kept close to 7.5 mm. for safety. In such situation, the practitioner will frequently abandon the whole philosophy of avoiding tight areas, and simply reduce or increase the diameter (by making a new lens) and trust that the resulting fit will cause the lens to change its position often enough to allow the tight areas to move from one place to another and so allow the tissue of the cornea to recover.

It must be understood that basic to the philosophy of wearing any foreign body against tissue, whether a wrist watch band on the wrist, or shoes on the feet, or dentures in the mouth or contact lenses on the eye, is the theory that the resulting pressures on the various tissues are countered by the inherent elasticity of the tissues. Also, that as long as the ensuing pressures of the foreign bodies are below these coefficients of elasticity of the tissues the tissues can bear them, but once exceeded then the tissues become irritated, their biological function disturbed and discomfort results. Therefore, it is not unusual to find a person with contact lenses that have significant touch or tight areas who wears the lenses temporarily with complete comfort. However, when these tissues are examined with the corneal slit lamp microscope, after an all day wearing period, disturbances of tissue structure are always found. When they are slight, the tissue completely recovers during the nighttime sleeping period when the contact lens is not worn. However, if such person persists and continues to wear his or her contact lenses over a long period of time, not infrequently these tissue cells begin to break down and after about six months to one year the person suddenly finds that he or she cannot wear the lenses at all.

It is to overcome this difficulty that the ellipsoidal surface is of great benefit—for by distributing the bearing surface over a greater area, the pressure per unit area is reduced, and tissue disturbances are minimized.

In the example given in FIG. 1, the practitioner may try, in view of the touch at E, to use a lens of 7.75 or 7.70 central radius and so avoid the touch at E. Occasionally, this may be successful—usually however, the touches at B, C and D are increased either in extent of area or in degree of tightness. Should the practitioner try to overcome the tight spots at B, C and D, by increasing the radius to 7.85 or 7.9, then the touch at E will become more pronounced and the ultimate discomfort of the patient even greater.

Any attempt to reduce the width of the 9.0 radius zone, in order to get bearing surface here, will usually quickly end in disaster, because a spherical surface cannot match or correspond to the ellipsoidal surface of the eye and must dig into it at its edges, and the resulting tight areas soon asphyxiate the cornea, and the patient notices a blurring of vision after 4 to 8 hours wear, as the cornea swells. This swelling may last from 1 to 10 hours after removal of the contact lens from the eye.

Various attempts to improve circulation of air and tears under the lens, such as the introduction of apertures, grooves, beads and slits, as disclosed in my U.S. Patent 2,129,305, have provided only temporary and limited relief to the patient.

One aspect of the present invention is a corneal contact lens which has an inner ellipsoidal surface in whole or in part conforming to the ellipsoidal surface of the cornea of the eye on which it is designed to rest. Such a lens may be fitted to the patient either on a measurement basis or on a trial case basis. The trial case procedure is discussed hereinafter in connection with another aspect of the invention. Another aspect of the present invention involves the development of a series of ellipsoidal lenses and combinations and variations thereof to serve as trial sets for determining the best fitting lens. Still another aspect of the invention involves a method of fabricating corneal contact lenses having an inner ellipsoidal surface.

An appreciation of the invention may be better understood from an inspection of FIG. 2 which shows an ellipse 10, the left portion of which approximates the form of the cornea. FIG. 2 is not drawn to scale and the ellipse 10 is exaggerated and deviates somewhat from the true form in order to more clearly show the positions of the different points and lines.

Since the cornea is a 3-dimensional ellipsoid, it is simpler to consider the horizontal meridian separately from the vertical meridian for these are frequently of different values and shapes. Therefore, let us designate in the horizontal plane (nasal-temporal) the BB line as the X axis, and for convenience when discussing the vertical plane (superior-inferior) the same BB line in the diagram as the Y axis. The Z axis is always the anterior-posterior line from the apex of the cornea through the center of the pupillary area of the fovea of the retina.

The X, Y and Z axes are the coordinate axes of the ellipsoid and are perpendicular to each other.

The line AO is the optic axis of the cornea and is the semi-axis major of the ellipse and may be 13.0 mm. The line OB is the semi-axis minor and may be 9.8 mm. The ellipse is shown in the horizontal plane as having its major axis as Z and minor axis as X, respectively. The line $R_0$ equals $AC_0$ and is the radius of the inscribed circle at the apex of this ellipse and is 7.3 mm. A line DD is drawn at right angles to the major Z axis such that it intersects the major axis at E and the ellipse at the two points D, D, and intersects the inscribed circle at points F, F. The line ED is made to be equal to 5.0 mm. The point D then represents the point on the corneal surface that is 5 mm. away from the optic axis AO of the cornea, i.e. $x=5$ mm. It is a fact that the point D on the ellipse never coincides with a point F on the circle except at the apex A. Stated another way, the rate of change of the curvature of the point D increases as it moves away from the apex towards point B while the rate of curvature of every point on the circle remains constant. This difference is the main problem in the more perfect fitting of contact lenses to the human eye which is solved by the present invention. The ellipsoidal inner surface of the contact lens of the invention is represented in the horizontal meridian by the elliptical portion DD, as is the cornea itself. A similar discussion applies to the vertical meridian where line BB is the Y axis.

*Method of determining the form of the ellipse of the corneal surface in any meridian*

Although there are several methods that may clinically furnish the value of the ellipse in any meridian, the preferred method is one in which radii measurements are taken at the pole of the cornea (really the ophthalmometer pole) and at any other known point. This method is done with a standard modern ophthalmometer or keratometer, and is subject to minimum error and is quickest and simplest to use. What is required is to find the general equation for the curvature at any point on an ellipse in a plane. This curvature can be expressed in terms of $R_0$, the radius of curvature at the pole of the cornea, and in terms of $R_5=DC_d$, the radius of the curvature at the point where $X=5$ mm. for the horizontal plane or for that matter in terms of $R_x$ for an value of $x$. Note FIG. 2. The equation is in terms of "$x$" because in the living eye the value of $R_x$ for any "X" coordinate is more easily measured than a linear measurement of any Z coordinate.

The derivation of the equation of curvature for any point on an ellipse in terms of "$x$" will now be given.

(1) The general equation of the ellipse in the horizontal meridian is $$\frac{z^2}{a^2}+\frac{x^2}{b^2}=1$$

where $a$=semi-major axis
where $b$=semi-minor axis (2) or $$b^2z^2+a^2x^2=a^2b^2$$

(3) by taking the first derivative, we now obtain $$x'=\frac{dx}{dz}=2b^2z+2a^2x\frac{dx}{dz}=0$$

(4) or $$a^2x\frac{dx}{dz}=-b^2z$$

(5) or $$x'=\frac{dx}{dz}=\frac{-b^2z}{a^2x};\text{ and } (x')^2=\frac{b^4z^2}{a^4x^2}$$

(6) now the derivative of $$d\left(\frac{u}{v}\right)=\frac{\text{V}du-udv}{\text{V}^2}$$

(7) therefore, the second derivative is $$x''=\frac{d^2x}{dz^2}=\frac{-a^2xb^2-b^2za^2\frac{dz}{dz}}{a^4x^2}$$

(8) or $$x''=\frac{-a^2b^2x+a^2b^2z\left(\frac{b^2z}{a^2x}\right)}{a^4x^2}$$

(9) $$x''=\frac{-a^2b^2x+\frac{b^4z^2}{x}}{a^4x^2}$$

(10) $$x''=\frac{-a^2b^2x^2+b^4z^2}{a^4x^3}$$

(11) $$x''=\frac{-b^2(a^2x^2+b^2z^2)}{a^4x^3}=\frac{-b^2(a^2b^2)}{a^4x^3}$$

(12) $$x''=-\frac{a^2b^4}{a^4x^3}=\frac{b^4}{a^2y^3}$$

(13) now the general equation for curvature K at any point on a curve is $$K=\frac{1}{r}=\frac{x''}{[1+(x')^2]^{3/2}}$$

(14) $$\therefore\frac{1}{r}=-\frac{b^4}{a^2x^3}\times\frac{1}{\left[1+\frac{b^4z^2}{a^4x^2}\right]^{3/2}}$$

(15) or $$\frac{1}{r}=-\frac{b^4}{a^2x^3}\times\frac{1}{\left[\frac{a^4x^2+b^4z^2}{a^4x^2}\right]^{3/2}}=\frac{-b^4}{a^2x^3}\times\frac{a^6x^3}{(a^4x^2+b^4z^2)^{3/2}}$$

(16) $$=\frac{-a^4b^4}{(a^4x^2+b^4z^2)^{3/2}}$$

(17) for the polar point of the ellipse, $X=0$, $Z=-a$ then $$K_o=\frac{1}{r_o}=\frac{-a^4b^4}{[(a^4\times0)+b^4a^2]^{3/2}}=\frac{-a^4b^4}{a^3b^6}=-\frac{a}{b^2}$$

(18) or $$r_o=-\frac{b^2}{a}$$

(19) from (16)

$$r=-\frac{[a^4x^2+b^4z^2]^{3/2}}{a^4b^4}$$

(20) from (2)

$$b^2z^2=a^2b^2-a^2x^2=a^2(b^2-x^2)$$

(21) $$\therefore r=-\frac{[a^4x^2+a^2b^4(b^2x^2)]^{3/2}}{a^4b^4}$$

(22) $$=-\frac{(a^4x^2+a^2b^4-a^2b^2x^2)^{3/2}}{a^4b^4}$$

(23) $$r=\frac{a^3(a^2x^2+b^4-b^2x^2))^{3/2}}{a^4b^4}$$

(24) $$r_x=\frac{(a^2x^2+b^4-b^2x^2)^{3/2}}{ab^4}$$

We now have a set of useful equations for determining the ellipse of any cornea in any meridian. We use equations

(18) $$r_o=-\frac{b^2}{a}$$

and

(24) $$r_x=\frac{(a^2x^2+b^4-b^2x^2)^{3/2}}{ab^4}$$

(25) for the vertical meridian $$r_y=\frac{(a^2y^2+b^4-b^2y^2)^{3/2}}{ab^4}$$

In Equation 18, for $r_o$ there is substituted the measured value of the ophthalmometer reading at the pole or as the patient looks directly into the center of the instrument. Here then, is one equation with $a$ and $b$, the semi-major and semi-minor axes. In Equation 24 there is substituted for $r_x$ the value obtained with the ophthalmometer while the eye is fixating that point to one side of the instrument axes such that the image to be measured falls precisely the distance "$x$" from the pole of the patient's eye. The value of "$x$" chosen should be as large as possible. Existing ophthalmometers will only measure up to $x$=5 mm. and sometimes to only $x$=4.5 mm. In any case, both the value of $x$ and $r_x$ are substituted in Equation 24 as a result of which there is obtained another equation with $a$ and $b$. Because there are now two simultaneous equations involving $a$ and $b$, it is a simple matter to solve for these values. Knowing the numerical values of $a$ and $b$ it is then possible to graph the ellipse that fits $R_0$ and $R_x$.

I have measured several hundred eyes and determined the values of $R_0$ and $R_5$ in each case. I have measured the two primary meridians, usually the horizontal and the vertical. I have also measured the $R_5$ both temporally and nasally and superior and inferior, where $R_5$ is the radius of curvature at the point where $x=5$ mm. FIG. 3 is helpful in an understanding of these measurements as related to the right eye. I have also measured many intermediate and secondary meridians between the two primary meridians. The data of interest will now be summed up. In this summation, the coordinates or axes of the cornea of the eye are designated as follows: The optic or visual axis (anterior-posterior) is the Z axis; the superior-inferior axis (vertical) is the Y axis, and the nasal-temporal axis is the X axis (horizontal).

(1) In almost all cases investigated, the nasal and temporal radii of curvature $R_5$ are both greater than the radius of curvature $R_0$ at the pole. This data fits the form of an ellipse. Where the nasal $R_5$ is equal to the temporal $R_5$ the ellipse is symmetrical around the optic or visual axis, whereas when the nasal $R_5$ differs from the temporal $R_5$ the ellipse is unsymmetrical around the optic or visual axis. (FIG. 4.) The vast majority of human eyes are unsymmetrical.

(2) The nasal radius of curvature $R_5$ is greater than the radius of curvature $R_0$ at the pole by amounts varying from 5% to 50% of $R_0$. The nasal radius of curvature $R_5$ is almost always greater than the temporal radius of curvature. The superior radius of curvature $R_5$ is closer to the inferior radius of curvature. Hence, ellipses of the cornea are generally unsymmetrical.

(3) In about 75% of the cases investigated, the superior-inferior ellipse of the Y axis is significantly smaller than the temporal-nasal ellipse of the axis.

The contact lens of the present invention is made to conform as precisely as possible to the measurements taken of the cornea in accordance with the foregoing findings. Accordingly, the lenses of the invention have interior ellipsoidal surfaces, some lenses having unsymmetrical ellipsoidal surfaces and others symmetrical ellipsoidal surfaces depending upon the configuration of the particular eye to be fitted. Where the vertical and horizontal measurements of the ellipses are different, the corneal contact lenses of the invention take care of two other types of elliptical surfaces. One such surface I call a "toric ellipsoid," the other I call an "elliptical torus."

FIG. 4 is given as an aid to the following definitions to illustrate how various ellipsoidal surfaces can be generated. FIG. 5 illustrates a corneal contact lens made in accordance with the invention having an ellipsoidal inner surface generated in the manner described herein.

By definition, a symmetrical "toric ellipsoid" is generated by rotating a symmetrical segment of an ellipse about one of its minor cords HH which is transverse of or perpendicular to the major axis. This will produce an ellipse in one meridian (usually horizontal for the eye) and a circle as cross-section in the other meridian. By definition, an unsymmetrical "toric ellipsoid" is generated by rotating a segment T of an ellipse and which is unsymmetrical with respect to the major axis about the chord JJ the perpendicular of which intersects the major axis at an angle $\alpha$. Also by definition, an "elliptical torus" is generated by rotating a segment of one size ellipse M around the contour of another size ellipse N. The resulting figure is similar to a squashed doughnut. The surface of such a torus will have as curvature in one meridian the ellipse M and at right angles the form of ellipse N.

I have found that corneal contact lenses made with the inside surfaces as toric ellipsoids conform most satisfactorily to eyes which have different vertical and horizontal ellipses. They are especially important in cases of high astigmatism and also where it is desired that there be a minimum or no rotation of the lens about the optic or Z axis (the anterior-posterior axis).

For convenience, I have adopted forms of notation as follows with respect to the lens of the invention:

$R_0$=radius of curvature of either the cornea or the inner surface of the corneal contact lens at the apex or pole, where $Z=a$ and $Y=0$ and $X=0$.

$R_x$ or $R_y$=radius of curvature of either the cornea or inner surface of the corneal contact lens at point where $x$ or $y$=some definite value. Usually, $R_5$ is used which represents the value of the radius of curvature in the horizontal meridian where $x=5$ mm. and in vertical meridian where $y=5$ mm.

To conveniently designate or identify the form of the ellipse for a given cornea or for a given corneal contact lens of the invention, I employ the expression $R_0-R_y$ in the vertical meridian, and in the horizontal meridian $R_0-R_x$. For example in the horizontal meridian (H) the ellipse may be written as $R_0=7.3-R_5=9.5$. These figures are sufficient to designate the precise form or equation of the ellipse concerned using these values of $x=5$ mm., $R_0=7.3$ mm. and $R_5=9.5$ mm. It is a simple matter with this information to make the proper substitutions in Equations 18 and 24 and solve for $a$ and $b$ and thus actually plot the curve of the ellipse.

A toric ellipsoid may be indicated as $$\frac{V|R_0=7.1}{H|R_0=7.3-R_5=9.5}$$

which means that the vertical meridian V has a circular radius of 7.1 mm. and that the horizontal meridian H is an ellipse of the form $R_0=7.3$ mm.$-R_5=9.5$ mm.

An elliptical torus is indicated as $$\frac{V|R_0=7.1-R_5=9.4}{H|R_0=7.3-R_5=9.5}$$

which means that the vertical meridian V is an ellipse of characteristics $R_0=7.1$ mm. and $R_5=9.4$ mm. and the horizontal meridian H is an ellipse of characteristics $R_0=7.3$ mm. and $R_5=9.5$ mm.

*The variation of the ellipsoidal surface to accommodate the optic zone*

When the radii of the cornea are successively measured at $X=Y=0$, 1, 2, 3, 4 and 5 mm., it becomes apparent that the enclosed pupillary area bounded by $x=y=3$ mm. (GG in FIG. 2), is very close to the inscribed circle of radius $R_0$. In other words, the pupillary optical zone coincides substantially for practical purposes with the inscribed sphere of radius $R_0$. In order to obtain the best possible visual results on patients fitted with corneal contact lenses of the present invention having inner ellipsoidal surfaces, I have found it desirable to make the optic zone area (GG in FIG. 2) an inscribed sphere of radius $R_0$. This spherical or optic zone usually varies from 6 to 7.5 mm. area in diameter. The result is that the lens in cross-section (FIG. 2) is of spherical surface up to GG on the inner surface thereof and then continues on as elliptical to points DD or beyond if a larger diameter lens is required. FIG. 6 is a perspective view of a corneal contact lens constructed in this manner in accordance with the invention.

*The method of making elliptical surfaced contact lenses*

A preferred method of making contact lenses with inner elliptical surfaces, involves the following steps:

(1) The data for the ellipse in any meridian is obtained from the two ophthalmometer readings on the eye in that meridian namely $R_0$ and $R_x$ or $R_y$.

(2) These radius readings are substituted in the simultaneous Equations 18 and 24, above $$R_0=-\frac{b^2}{a}$$

$$R_y=\frac{(a^2y^2+b^4-b^2y^2)^{3/2}}{ab^4}$$

or $$R_x=\frac{(a^2x^2+b^4-b^2x^2)^{3/2}}{ab^4}$$

and the equations solved for "$a$" and "$b$."

(3) These values of $a$ and $b$ are used as constants in Equation 1, and the equation of this ellipse is plotted in the usual way.

(4) From this graph a positive brass master gauge 6 and a negative brass master gauge 8 are made, in the manner illustrated in FIG. 7.

(5) These master gauges or templates are used as guides on a tracer lathe to turn a ½" (one-half inch diameter) round steel rod 12 into a male ellipsoid die to fit the negative master gauge 8. Note FIG. 8.

(6) The ellipsoidal surface of the die 12 is then ground and polished in the same manner as is usually done for non-spherical surfaces, as described by F. Twyman in "Prism & Lens Making" published by Hilger & Watts, Ltd., London, 2nd ed., 1952, pages 323–363. While the polishing is progressing the $R_0$ and the $R_x$ or $R_y$ can be checked with a Radiuscope (an instrument manufactured by the American Optical Co.) to insure that the proper $R_0$ is maintained at the apex, and with the master template to insure that the rest of the ellipse is correct and true.

(7) Where it is desired to have the central optic zone spherical for a given area, say 7.0 mm. diameter, then a second grinding and polishing is done in the central zone with the usual spherical laps used for spherical surfaces. Care should be exercised to secure the exact diameter required and to have the elliptical and spherical sectors meet in at an almost invisible boundary. The composite curved die must then fit the spherical gauge of $R_0$ in the optic zone, and the elliptical gauge throughout the remaining area.

This finished die then serves as a positive die which together with the proper negative die to obtain the necessary prescription will furnish a finished contact lens having the inner surface ellipsoidal with a spherical optic zone. The surface of the negative die is spherical and of such radius as to give the proper prescription or refracting power required for an individual patient when computed to $R_0$. The negative die can of course be made toric to correct any residual astigmatism that a patient has when a spherical optic zone lens is in his eye. The surface of the negative die can also be made with two radii or three radii to produce a bifocal effect or trifocal effect as indicated in FIGS. 7, 8 and 9 of my U.S. Patent No. 2,129,305. In fact, other lens changes can also be made through variation of the negative die, such as lenticular effects, prism effect etc.

The two dies must be of precisely the same diameter and fit into a steel sleeve 14 where the clearance tolerance between the two cylindrical surfaces must be kept to ±.0001, as shown in FIG. 9. This tolerance must be kept because, in the casting process, the excess liquid monomer will then escape and carry off with it the fine bubbles trapped between the dies. When the tolerance between the sides of the die and the sleeve is increased, bubbles will nearly always be trapped and appear in the finished lens and prevent its use. The inner surface 9 of the negative die 13 of FIG. 7 is generally spherical while the inner surface 11 of the positive die 15 is elliptical or spherical or a composite of the two or any other desired shape.

As is customary in the casting process of acrylic resins, some amount of pressure is required on the dies during the curing cycle. I have found that a torque pressure of 10 lbs. to 20 lbs. per sq. inch applied by the clamp structure 17 is required. The acrylic resin used between the surfaces 9 and 11 of the two dies to form the contact lens is methyl methacrylate in powdered form with the liquid monomer mixed with it to form a syrup. The liquid monomer must be in excess in order to drive out any air that is trapped between the dies, both to avoid bubbles and to insure a proper chemcial cure. This liquid monomer hardens under temperature and pressure.

This process of casting the contact lens is the same whatever positive dies are used, i.e. spherical, ellipsoidal or a composite of the two, or toric ellipsoid or elliptical torus or for that matter any formed surface that can be highly polished. The dies themselves can be made of glass or hardened steel material or, for short runs, even of stainless steel. The important principle is that the volume of the syrup introduced plus the pressure and the curing cycle used are the determining factors in the final center thickness of the contact lens. The center thickness usually is kept at a minimum for each prescription and can be controlled to ±.10 mm.

The curing cycle is generally between 60° C. and 65° C. for at least 8 to 10 hours. It is possible to cure for shorter times at higher temperatures, but the change in the shrinkage rate cannot be controlled as well. The amount of syrup that must be used, by weight or volume, is critical since it must be different for various prescriptions and must allow for shrinkage, and for excess to seal the dies in the sleeve against contamination with air. Practice (a trial and error procedure) soon permits of a precise determination of the quantity of syrup needed for the different prescriptions and thickness.

After curing, the dies are allowed to cool to room temperature, the clamp is loosened, the dies separated, and the finished lens removed. The finished lens is inspected for center thickness, radii of curvature of inner and outer surfaces, refracting power etc. The lens is always cast larger in diameter than required and then optically centered on a lathe and cut down to desired diameter. The edges are then smoothed, rounded or tapered as the case requires and is so completed.

*An alternative method of making a composite spherical optic zone and an ellipsoidal inside surface.*

I have evolved a method of taking a finished spherical contact lens, that is, one which has the required $R_0$ in the spherical optic zone on the interior surface, and a proper curve on the exterior surface (to give the proper prescription) and then grinding onto the inner surface outside of the optical zone of the lens an ellipsoidal peripheral surface (or toric ellipsoid or elliptical torus surface) of selected desired dimensions to fit the patient's eye. The method involves the folowing steps and utilizes the equipment shown in FIG. 10.

(1) A positive grinding tool 19 of the desired ellipsoidal surface 20 is formed, preferably of cast iron or meanite metal or abrasive stone, and of an outer diameter of approximately 11.0 mm. The grinding tool has a flat surface at 21 extending over an area of 6.5 mm. diameter. The major or long axis of the ellipse lies along the long axis of the shaft 22.

(2) The grinding tool 19 is mounted in a chuck and linked by means of a shaft 22 to a motor lathe turning at a speed of about 150 r.p.m. A spherical contact lens 18 is then mounted on a suitable stationery holder 23 with either blocking wax or double adhesive tape (adhesive on both sides of the tape) 24.

(3) While the ellipsoidal tool is rotating in the chuck of the motor, fine emery is added when cast iron is used, or water added when an abrasive stone tool is used, and the lens brought in contact with the ellipsoidal tool. If the proper tool has been selected, the grinding will always start at the outer periphery and continue inwards, thereby grinding a fairly true elliptical surface. The lens holder is held in the hand and barely oscillated only ½ mm. to and fro to break up (for polishing purposes) the circular grinding marks left by the emery grains. This is continued until the desired optic zone area is left. This is usually 7 mm. to 7.5 mm. Where necessary, this can be reduced to 6.5 mm. and even less.

(4) The lens is polished with a flexible polisher made of sponge rubber shaped to the approximate form of ellipsoid and covered with a polishing cloth. This, together with any standard plastic polishing liquid, will polish out any grinding marks left in the lens and give a high gloss and smooth finish.

(5) Thus, by having a set of grinding tools made up with varying ellipsoidal surfaces through a range as found in the human eye it is possible to create such surfaces on all spherically formed contact lenses. In the human eye, $R_0$ usually varies from 7.0 to 8.7 mm., generally in steps of .05 mm. and $R_5$ varies from 7.5 to 11.5 mm. in steps of .5 mm.; hence there may be required approximately 200 tools for grinding the elliptical surfaces on all sizes of the finished spherical lenses unless a greater tolerance can be permitted in the fitting of the lenses to the eye, in which case only half the number of tools will be required. This method permits the practitioner to make modifications while the patient is still before him in the office.

Although under critical test conditions the ellipsoidal surfaces so formed are not as precise as those formed from dies described above, they have been found extremely effective in clinical practice.

(6) A toric ellipsoid or an ellipsoidal torus surface can be ground on a spherical contact lens by starting with a toric ellipsoid or ellipsoidal torus grinding tool and mounting the lens holder in a jig similar to that used in grinding toric surfaces on spectacle lenses. Essentially, this simply consists in insuring that while the lens oscillates from side to side and rotates, that the grinding tool similarly oscillates in synchronism therewith and that the coordinate $x$ and $y$ axes of the lens and grinding tool remain fixed relative to one another.

*A series of ellipsoidal test lenses*

As a result of applying my invention of ellipsoidal surfaced contact lenses successfully to many patients where each lens was a custom made ellipsoid obtained from measurements of the individual eyes, I have found it extremely helpful to set up a test series of such lenses so as to quickly check the fit on a patient at the initial visit, and select the proper fitting lens. Such testing expedites the fitting and indicates the nature of adjustments that may also be required. It also allows the patient to wear the lens for several hours initially and so judge the general effect of lenses on the eye. In a majority of the cases, a precise fit can be achieved from the test series.

For normal eyes, neglecting keratoconus, scars, injury or diseased corneas, the $R_0$ usually is limited in range between $R_0=7.0$ mm. to $R_0=8.7$. I have also found that the limits of the radius at $x=y=5$ mm. (DD, FIG. 2) are from .5 mm. to 3.0 mm. larger than the corresponding $R_0$. I have, therefore, set up a test series of lenses where the $R_0$ is allowed to vary in increasing increments of .05 mm. through the limits of $R_0$, and $R_5$ is varied in increasing increments of .5 mm. through its range of 7.50 mm. to 11.50 mm. This gives rise to a series as indicated in the chart of FIG. 11 where each $x$ mark indicates a lens. Here the optic zone is spherical and is approximately 7.0 mm. in diameter.

Should further experience show the desirability of further refining the series of test lenses, then $R_5$ can be varied in smaller increments.

In cases of keratoconus I have found that excellent results can be achieved by extending the series of test lenses in a manner similar to that indicated in FIG. 11 to another series #2 such that $R_0$ ranges from $R_0=4.0$ to $R_0=7.0$ and $R_5$ ranges from an increase of 3.0 mm. to 5.0 mm. above the value of $R_0$ in steps of 0.5 mm.

In cases of high corneal astigmatism as measured at $R_0$, i.e. where the radii difference is 0.2 mm. to 1.5 mm. greater and also where differences are found at $R_5$ between the horizontal and vertical meridians, a toric ellipsoidal test series of lenses (series #3) should be used. Here, there is a fixed value for the $R_0$—$R_5$ ellipse in one meridian, usually the horizontal, for each series. Then, $R_0$ of the ellipse varies in the one meridian and a spherical radius varies in the other. Such a test series of lenses is shown in the chart of FIG. 12. In this series, $R_5$ is kept always larger than $R_0$ by 0.5 mm. thereby giving rise to a specified ellipse for each value of $R_0$ from $R_0=7.25$ mm. to $R_0=8.7$ mm. At the same time, at right angles to this ellipse is the other primary meridian which is part of a circle and so forms the toric ellipsoid. In the vertical meridian, the radii may be varied in steps of 0.1 mm.

In order to cover the wide range of such toric ellipses which are possible, I set up the following additional seven test series of contact lenses to satisfy the constants set forth in line with each series.

Series #4—where the difference between $R_0$ and $R_5$ $(R_0-R_5)=1.0$
Series #5—where the difference between $R_0$ and $R_5$ $(R_0-R_5)=1.5$
Series #6—where the difference between $R_0$ and $R_5$ $(R_0-R_5)=2.0$
Series #7—where the difference between $R_0$ and $R_5$ $(R_0-R_5)=2.5$
Series #8—where the difference between $R_0$ and $R_5$ $(R_0-R_5)=3.0$
Series #9—where the difference between $R_0$ and $R_5$ $(R_0-R_5)=3.5$
Series #10—where the difference between $R_0$ and $R_5$ $(R_0-R_5)=4.0$ With such an arrangement, as many as 1600 different combinations of lens surfaces can be obtained for fitting various eyes. In practice, however, this number may be reduced to approximately 400 by allowing greater tolerances between sizes.

In FIG. 12, the spherical meridian is shown as the vertical meridian. There are cases where this is the horizontal meridian, in which case the lens is turned through 90°.

In addition, I have made lenses with various series of "elliptical toruses." Here the vertical ellipse varies through a series of fixed values between $R_0$—$R_5$ over the whole range from $R_0=7.0$ to $R_0=8.7$ and the difference in $R_5$ in any lens is from 1.5 to 3.0 mm. greater than $R_0$ in steps of 0.5 mm. The horizontal ellipses also vary in a similar manner ranging from $R_0=7.0$ to $R_0=8.7$ and the differences in $R_5$ in any lens is from 1.5 to 3.0 mm. greater than $R_0$ in steps of 0.5 mm. A total of 16 elliptical torus test series of lenses is then available from the above.

Another method of making a lens to conform with the invention is as follows: Cast a blank or "button" of transparent plastic with an inner finished surface to be wholly elliptical or toric ellipsoid, or elliptical torus form. This would be approximately ⅝-inch in diameter and about 2 mm. thick. The outer surface could be a rough flat surface. This blank can then be distributed in this form to individual contact lens manufacturers who, in turn, can perform other work on the blank, such as grinding and polishing the center of the ellipse of the inner surface into a spherical optical zone of the proper radius and diameter. The outside surface can then be cut and ground and polished to the required radius to provide any prescription that is desired. These blanks or "buttons" can be used to form individual lenses or serve as the bases of the different series described above. If desired, the semi-finished blanks can be provided with a completed central optic zone on the inner elliptical surface before the blank is distributed to the contact lens manufacturers. These blanks can be cast with finished inside surfaces and rough outside surfaces.

What is claimed is:

1. A corneal contact lens of concavo-convex form and of a size to lie within the area defined by the cornea, having an inner ellipsoidal surface, said ellipsoidal surface having its vertex on the major axis of the ellipsoid wherein in at least a first meridian the ellipse conforms substantially to the equations $$(1)\qquad r_o = \frac{b^2}{a}$$

$$(2)\qquad r_x = \frac{(a^2x^2 + b^4 - b^2x^2)^{3/2}}{ab^4}$$

where $r_0$=the radius of curvature at the apex of the cornea;

$r_x$=the radius of curvature of the cornea at that point which is a distance $x$ approximately 4.5 mm. from the major axis of the ellipse contained in said meridian;

$a$=the semi-major axis of the ellipse in said meridian; and $b$=the semi-minor axis of said ellipse.

2. A corneal contact lens as defined in claim 1, wherein the central portion of said ellipsoidal surface closely approximates a spherical surface having the radius $r_0$.

3. A corneal contact lens as defined in claim 1, wherein the meridian at right angles to said first meridian is a circle and said ellipsoidal surface constitutes a toric ellipsoid.

4. A corneal contact lens as defined in claim 1, wherein the meridian at right angles to said first meridian is an ellipse which differs from the ellipse in the first meridian, and said ellipsoidal surface constitutes an elliptical torus.

5. A corneal contact lens as defined in claim 1 having an unfinished outer surface opposite said ellipsoidal surface, and being of sufficient thickness to allow the grinding and polishing of a suitable optical curve on said outer surface to satisfy a desired prescription.

References Cited by the Examiner

UNITED STATES PATENTS

| | | | |
|---|---|---|---|
| 2,130,987 | 9/1938 | Person et al. | 51—209 |
| 2,330,837 | 10/1943 | Mullen | 18—56 |
| 2,544,246 | 3/1951 | Butterfield | 88—54.5 |
| 2,653,515 | 9/1953 | Stimson | 88—54.5 |
| 2,990,664 | 7/1961 | Cepero | 51—284 |
| 3,030,859 | 4/1962 | Elliot | 88—54.5 |
| 3,079,737 | 3/1963 | Kratt et al. | 88—54.5 |

FOREIGN PATENTS

| | | |
|---|---|---|
| 926,462 | 4/1947 | France. |
| 826,204 | 12/1951 | Germany. |
| 620,852 | 3/1949 | Great Britain. |

OTHER REFERENCES

Bayshore, "Exploration of the Corneal Curvature," article in Contacto, July 1959, pp. 188–190.

Bier, "Corneal Lenses—Another Viewpoint," article in The Optician, November 10, 1950, pp. 435 and 436.

Bier, "The Contour Lens," article in The Optician, November 2, 1956, pp. 397–399.

Feinbloom, "The Gyroscope Contact Lens," article in The Optical Journal and Review of Optometry, May 1, 1956, pp. 25–27 and 65.

Helmholtz, "Physiological Optics," vol. I, 1924, textbook published by The Optical Society of America, pp. 309–315.

Reynolds, "The Photo Electric Keratoscope," article in Contacto, March 1959, pp. 53–59.

Voss, "New Techniques of Fitting Corneal Lenses in Astigmatism," article in The Optician, May 6, 1955, pp. 402 and 403.

DAVID H. RUBIN, *Primary Examiner.*